United States Patent Office 2,928,291
Patented Mar. 15, 1960

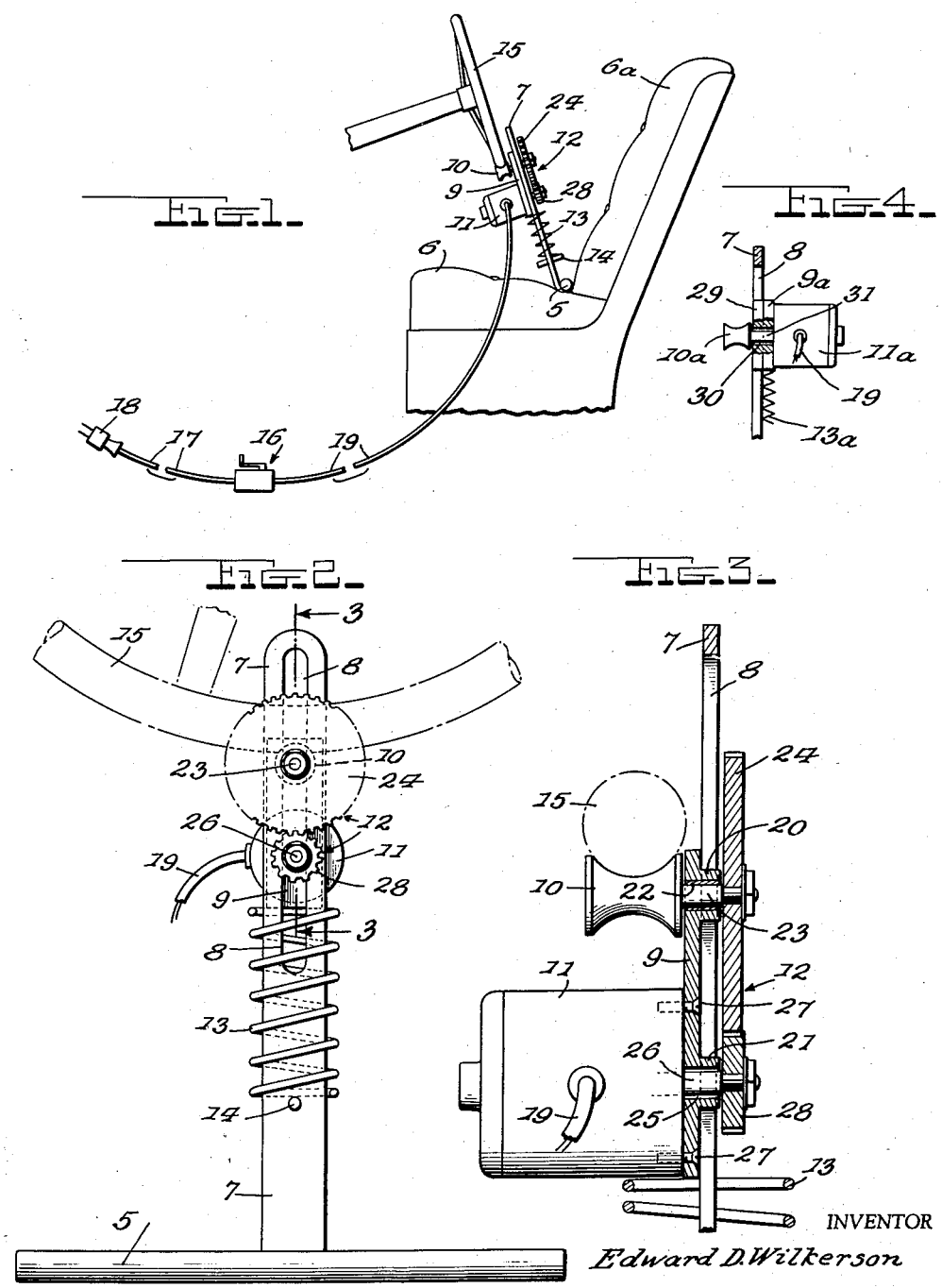

2,928,291
DEVICE AND METHOD FOR CUTTING THE FRONT WHEELS OF AUTOMOBILES WHILE PERFORMING FRONT-END OPERATIONS

Edward D. Wilkerson, Livingston, N.J.

Application May 7, 1956, Serial No. 583,286

6 Claims. (Cl. 74—494)

In checking the front ends of automobiles for wheel alignment and in performing other front-end operations, it is necessary to repeatedly cut the front wheels to the right and left by rotating the steering wheel. This has become rather difficult due to low pressure tires and to the high-ratio steering gears employed in cars having power steering. Moreover, when such operations are performed with the car supported on a rack or hoist to enable the mechanic to work in a standing position, the steering wheel is not accessible without a ladder. Furthermore, the operations either waste one mechanic's time by necessitating that he repeatedly move from the front end of the car to the steering wheel and vice versa, or waste another man's time by assigning him to turn the steering wheel as required.

One object of the present invention is to overcome the above mentioned adverse conditions by the provision of a novel device for power-driving the steering wheel in either direction, said device having control means operable by a mechanic without leaving the front end of the car.

Another object is to provide a friction wheel and an electric motor for driving the same, and to provide supporting means for said motor and friction wheel effective to hold said friction wheel in driving contact with the rim of the steering wheel, the motor being controlled by switch means which the mechanic leaves at the front end of the car in readily accessible position.

Yet another object is to provide a novel device of the class set forth which includes a supporting structure having a base to rest on the front seat of the car.

A further object is to provide a novel device of the class set forth, in which the aforesaid base is horizontally elongated and adapted for positioning in the angle between the front seat and the seat back.

A still further object is to provide a novel construction including spring means which acts to tightly hold the friction wheel in driving engagement with the lower side of the steering wheel rim, said spring means reacting downwardly on the supporting structure and thus serving to stably hold the base of this structure in proper position on the car seat.

A still further object is to provide a simple and practical construction which may be profitably manufactured and sold at a reasonable price, may be quickly and easily applied and removed, and will give efficient and trouble-free service.

Yet another object is to provide a novel method for cutting the front wheels of an automobile, said method comprising the steps of mounting a motor-driven friction wheel in driving contact with the steering wheel rim, and manually controlling the direction of rotation of said friction wheel without leaving the front end of the car, whether this method be performed with the aid of the device herein disclosed or in some other manner.

With the above and other objects in view that will hereinafter appear, the nature of the invention will be more clearly understood by reference to the following detailed description, the appended claims and the several views illustrated in the accompanying drawings.

In the drawings:

Figure 1 of the accompanying drawing is a side elevation showing one form of the invention in operative position.

Figure 2 is a rear elevation of the device shown in Figure 1.

Figure 3 is an enlarged vertical sectional view, partly in elevation, on line 3—3 of Figure 2.

Figure 4 is a view similar to a portion of Figure 3 but showing another form of construction.

A base 5 is provided, to rest on the front seat 6 of an automobile, said base being preferably in the form of a horizontally elongated member adapting it for positioning in the angle between the seat 6 and the seat back 6a, as seen in Figure 1. The elongated base may well be a length of rod, pipe or tubular steel. A metal post 7 is welded or otherwise secured to the central portion of the base 5 and rises therefrom, said post having a longitudinal slot 8.

In Figures 1 to 3, a slide plate 9 is disposed at the front side of the post 7 and carries a peripherally grooved friction wheel 10, an electric motor 11, and reduction gearing 12 operatively connecting said motor and friction wheel. In Figure 4, however, a slide plate 9a is disposed at the rear of the post 7 and carries a motor 11a which directly drives the grooved friction wheel 10a. The slide plate 9 is urged upwardly by a coiled spring 13, and a similar spring 13a is provided for the plate 9a. In either instance, the spring reacts downwardly on the post 7, the latter being provided with a suitable abutment for said spring. The abutment is shown in Figures 1 and 2 in the form of a pin 14.

When the device is not in use, the spring 13 (or 13a) holds the slide 9 (or 9a) in an abnormally high position. Thus, when the device is to be used, the slide must be forced downwardly in order that the friction wheel 10 (or 10a) may be engaged with the lower side of the rim of the steering wheel 15, after properly positioning the base 5. When the device is so applied, the upward pressure of the spring holds the friction wheel in driving engagement with the steering wheel rim, and the downward reaction of said spring on the post 7 holds the base 5 in proper position. As this base extends in both directions from the post 7, it effectively holds this post against undesirable tilting under the influence of the motor torque when the motor is driven in either direction.

The motor 11 or 11a is controlled by suitable switch means which the mechanic places in a convenient position at the front of the car. In the present disclosure, a switch 16 is conventionally illustrated in Figure 1 and may be considered as including all necessary elements to start, stop and reverse the motor. A current-supply cable 17 extends to the switch 16 and is provided with a plug 18 for engagement with a conventional service outlet, and a current-conducting cable 19 extends from said switch to the motor 11 or 11a, said cable 19 being of sufficient length to give the mechanic wide latitude in conveniently placing the switch 16.

If desired, instead of incorporating motor starting, stopping and reversing means in the single switch 16, a starting and stopping switch and a separate reversing switch could of course be employed. In either instance, a mechanic working at the front end of the car, can cause power driving of the steering wheel 15 in either direction, to cut the front wheels to the right or left to any required extent.

Referring more specifically to the construction shown in Figures 1 to 3, it will be observed that the slide plate 9 is provided with an upper boss 20 and a lower boss 21, both of which extend through the slot 8 of the post 7. The upper boss 20 and contiguous portion of the slide plate 9 are apertured to receive a bushing 22 in which a shaft 23 is rotatably mounted. The front end of this shaft carries the friction wheel 10 and the rear end of said shaft is provided with a gear 24. The lower boss 21 and contiguous portion of the slide plate 9 are formed with an opening 25 through which the shaft 26 of the motor 11 extends. This motor is secured by screws 27 against the front side of the slide plate 9 and the rear end of the motor shaft 26 is provided with a pinion 28 meshing with the gear 24. This pinion and gear form the reduction gearing 12 above mentioned.

In Figure 4, the slide plate 9a is provided with a rib 29 slidable in the slot 8 of the post 7, said plate and rib having an opening 30 through which the motor shaft 31 extends. This shaft directly carries the friction wheel 10a. The diameter of this friction wheel is greater than the width of the slot 8 and the wheel thus holds the slide plate 9a against separation from the post 7.

From the foregoing, it will be seen that novel and advantageous provision has been disclosed for attaining the desired ends. However, attention is invited to the possibility of making variations within the scope of the invention as claimed.

I claim:

1. A device for cutting the front wheels of an automobile while performing front-end operations, comprising a supporting structure having a base to rest on and be supported solely by the front seat of the automobile; a motor-driven friction wheel mounted on said supporting structure for driving contact with the rim of the automobile steering wheel, and current-conducting means for the driving motor of said friction wheel, said current-conducting means including a motor-reversing switch.

2. A structure as specified in claim 1, in which said supporting structure includes a stationary member secured to said base, and a vertically movable member mounted on said stationary member and carrying said friction wheel; and spring means acting upwardly on said vertically movable member and reacting on said stationary member.

3. A structure as specified in claim 1; said base being horizontally elongated and adapted for reception in the angle between the automobile seat and the seat back.

4. A structure as specified in claim 1; said base being horizontally elongated and adapted for reception in the angle between the automobile seat and the seat back, said supporting structure including a stationary member secured to said elongated base, and a vertically movable member mounted on said stationary member and carrying said friction wheel; and spring means acting upwardly on said vertically movable member and reacting on said stationary member.

5. A device for cutting the front wheels of an automobile while performing front-end operations, comprising a horizontally elongated base for reception in the angle between the front seat of the automobile and the seat back, a post secured to and rising from an intermediate portion of said base, peripherally grooved friction wheel and a driving motor therefor, said friction wheel being engageable with the lower side of the rim of the automobile steering wheel, a slide carrying said friction wheel and motor, said slide being mounted for vertical movement on said post, spring means acting upwardly on said slide and reacting on said post, and current-conducting means for said motor, including a reversing switch.

6. A device for cutting the front wheels of an automobile while performing front-end operations, comprising a horizontally elongated base for reception in the angle between the front seat of the automobile and the seat back, a post secured to and rising from an intermediate portion of said base, said post having a longitudinal slot, a slide plate resting against the front side of said post and having an upper and a lower boss slidably received in said slot, a shaft extending rotatably through said slide plate and said upper boss, said shaft having a peripherally grooved friction wheel on its front end for driving contact with the rim of the automobile steering wheel, a gear secured on the rear end of said shaft in abutting relation with the rear side of said post, an electric motor at the front side of said slide plate and secured to the latter, the shaft of said motor extending through said slide plate and said lower boss, a pinion secured on said motor shaft and meshing with said gear, spring means acting upwardly on said slide plate and reacting on said post, and current-conducting means for said motor, including a reversing switch.

References Cited in the file of this patent

UNITED STATES PATENTS

| | | |
|---|---|---|
| 1,247,732 | Shelton | Nov. 27, 1917 |
| 1,484,548 | Bickerstaff | Feb. 19, 1924 |
| 1,935,355 | Gaubert | Nov. 14, 1933 |
| 2,566,674 | Odenthal | Sept. 4, 1951 |
| 2,625,837 | Holmes | Jan. 20, 1953 |
| 2,743,616 | Hayward et al. | May 1, 1956 |
| 2,805,585 | Besserman | Sept. 10, 1957 |